(12) United States Patent
Fujii

(10) Patent No.: US 12,055,619 B2
(45) Date of Patent: Aug. 6, 2024

(54) DISTANCE MEASUREMENT SYSTEM, AND DISTANCE MEASUREMENT METHOD

(71) Applicant: DENSO CORPORATION, Kariya (JP)

(72) Inventor: Ryozou Fujii, Kariya (JP)

(73) Assignee: DENSO CORPORATION, Kariya (JP)

(*) Notice: Subject to any disclaimer, the term of this patent is extended or adjusted under 35 U.S.C. 154(b) by 384 days.

(21) Appl. No.: 17/587,816

(22) Filed: Jan. 28, 2022

(65) Prior Publication Data

US 2022/0146656 A1 May 12, 2022

Related U.S. Application Data

(63) Continuation of application No. PCT/JP2020/028932, filed on Jul. 28, 2020.

(30) Foreign Application Priority Data

Aug. 1, 2019 (JP) ................ 2019-141884

(51) Int. Cl.
*G01S 13/32* (2006.01)
*G01S 7/40* (2006.01)
*G01S 7/41* (2006.01)

(52) U.S. Cl.
CPC ............ *G01S 13/32* (2013.01); *G01S 7/4008* (2013.01); *G01S 7/41* (2013.01)

(58) Field of Classification Search
CPC ........... G01S 7/41; G01S 7/4008; G01S 13/32
See application file for complete search history.

(56) References Cited

U.S. PATENT DOCUMENTS

2017/0322287 A1* 11/2017 Benbouhout ............ B60R 25/24

FOREIGN PATENT DOCUMENTS

| JP | 2010074699 A | | 4/2010 | |
|----|----|----|----|----|
| JP | 6260438 B2 | * | 1/2018 | |
| JP | 2019121949 A | * | 7/2019 | ........... B60R 25/245 |
| JP | 2020159980 A | * | 10/2020 | |
| JP | 6995732 B2 | * | 1/2022 | ............ H04W 36/08 |
| KR | 2039105 B1 | * | 10/2019 | ............... G01S 1/68 |

* cited by examiner

*Primary Examiner* — James R Hulka
*Assistant Examiner* — Maxine McKenzie Phillips
(74) *Attorney, Agent, or Firm* — Harness, Dickey & Pierce, P.L.C.

(57) ABSTRACT

A portable device transmits wirelessly pilot signals of a plurality of frequencies sequentially at predetermined time intervals. Upon receiving the pilot signals, the in-vehicle device determines whether a slope of a straight line obtained by linearly approximating a time and a reception signal strength of each of the pilot signals is equal to or less than a predetermined slope threshold value. In response to a predetermined allowable condition including the slope being determined to be equal to or less than the slope threshold value being satisfied, a distance between the portable device and the in-vehicle device obtained by a distance measurement process is specified as a high reliability distance. In response to the predetermined allowable condition being not satisfied, the distance obtained by the distance measurement process is prevented from being specified as the high reliability distance or the distance measurement process is prevented from being executed.

8 Claims, 13 Drawing Sheets

2ND EMBODIMENT

DISTANCE MEASUREMENT SYSTEM, AND DISTANCE MEASUREMENT METHOD

CROSS REFERENCE TO RELATED APPLICATIONS

The present application is a continuation application of International Patent Application No. PCT/JP2020/028932 filed on Jul. 28, 2020, which designated the U.S. and claims the benefit of priority from Japanese Patent Application No. 2019-141884 filed on Aug. 1, 2019. The entire disclosures of all of the above applications are incorporated herein by reference.

TECHNICAL FIELD

The present disclosure relates to measuring a distance between an in-vehicle device and a portable device.

BACKGROUND

The functions such as so-called keyless entry or smart entry are adopted as part of functions of a vehicle. In the keyless entry or the smart entry, a control device (i.e., in-vehicle device) mounted in a vehicle wirelessly communicates with a portable device that functions as an electronic key for the vehicle to lock and unlock the vehicle door and the engine. In such functions, the distance between the in-vehicle device and the portable device is measured by using the wireless communication. When measuring a distance using the wireless communication, the signals for distance measurement propagate in multipath and interfere with each other, so that the signal levels are lowered and the distance measurement result may vary. In a known distance measurement, the variation (standard deviation) in the distance measurement results is obtained in advance for each of a plurality of frequencies that can be used for wireless communication, and the frequency used for the distance measurement is determined.

SUMMARY

According to an example of the present disclosure, a portable device transmits wirelessly pilot signals of a plurality of frequencies sequentially at predetermined time intervals. Upon receiving the pilot signals, the in-vehicle device determines whether a slope of a straight line obtained by linearly approximating a time and a reception signal strength of each of the pilot signals is equal to or less than a predetermined slope threshold value. In response to a predetermined allowable condition including the slope being determined to be equal to or less than the slope threshold value being satisfied, a distance between the portable device and the in-vehicle device obtained by a distance measurement process is specified as a high reliability distance. In response to the predetermined allowable condition being not satisfied, the distance obtained by the distance measurement process is prevented from being specified as the high reliability distance or the distance measurement process is prevented from being executed.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

A. First Embodiment

Figure 1:
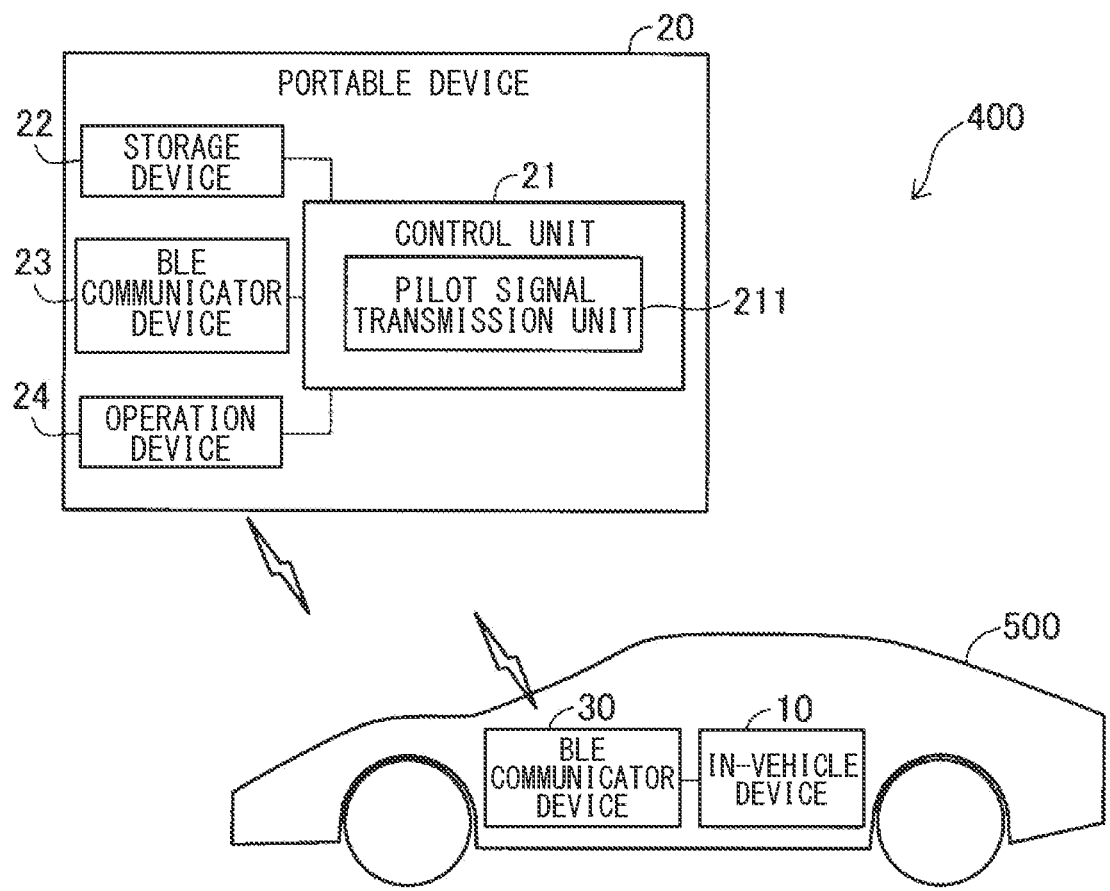
FIG. 1 is an explanatory diagram showing a schematic configuration of a distance measurement system according to an embodiment of the present disclosure.

A1. System Configuration:

A distance measurement system 400 shown in FIG. 1 includes a so-called in-vehicle device 10 mounted on a vehicle 500 and a portable device 20 that performs wireless communication with the in-vehicle device 10, to measure a distance between the in-vehicle device 10 and the portable device 20. More precisely, the distance measurement system 400 measures the distance between a wireless antenna of a BLE communicator device 30 used for wireless communication by the in-vehicle device 10 and a wireless antenna included in the portable device 20. In this embodiment, the measured distance is used in so-called smart entry. For example, the smart entry is performed with, as a trigger, a predetermined operation performed by the user when the distance between the in-vehicle device 10 and the portable device 20 is equal to or less than a predetermined threshold distance. That is, in response to the trigger arising, the door of the vehicle 500 is automatically locked or unlocked, and the engine of the vehicle 500 is started or stopped. Further, for example, when the distance is equal to or less than a predetermined threshold distance, turning on the light of the vehicle 500 or unlocking the door of the vehicle 500 is performed automatically without any operation by the user.

The in-vehicle device 10 and the portable device 20 perform BLE (Bluetooth Low Energy, registered trademark) communication with each other. In BLE communication, communication is performed in a radio frequency band of 2.4 GHz. Such a radio frequency band is divided into a total of 40 channels (channels 0 to 39) from 2.404 GHz to 2.480 GHz, and radio packets are transmitted and received while hopping between these channels.

The portable device 20 includes a control unit 21, a storage device 22, a BLE communicator device 23, and an operation device 24. In the present embodiment, the portable device 20 is composed of a so-called smartphone. The control unit 21 controls the portable device 20 as a whole. The control unit 21 includes a CPU (not shown), and functions as a pilot signal transmission unit 211 when the CPU executes a control program stored in the storage device 22 in advance. The pilot signal transmission unit 211 sequentially transmits pilot signals at predetermined time intervals. The pilot signals, which are distance measurement signals, are radio signals of a plurality of frequencies different from each other included in the above-mentioned 2.4 GHz radio frequency band. The specific processes will be described later.

The storage device 22 includes a non-volatile memory, for example, EEPROM (Electrically Erasable Programmable Read-Only Memory), and stores the above-mentioned control program in advance.

The BLE communicator device 23 includes an antenna, a transmission circuit, and a reception circuit, and executes BLE communication. The transmission circuit modulates or amplifies the carrier waves by the transmission data passed from the control unit 21. The reception circuit amplifies and encodes the received BLE radio signal, and passes the digital data extracted from the received signal to the control unit 21.

The operation device 24 has a switch (not shown) for commanding the opening/closing, unlocking/locking, etc. of the door of the vehicle 500 described above.

Figure 2:
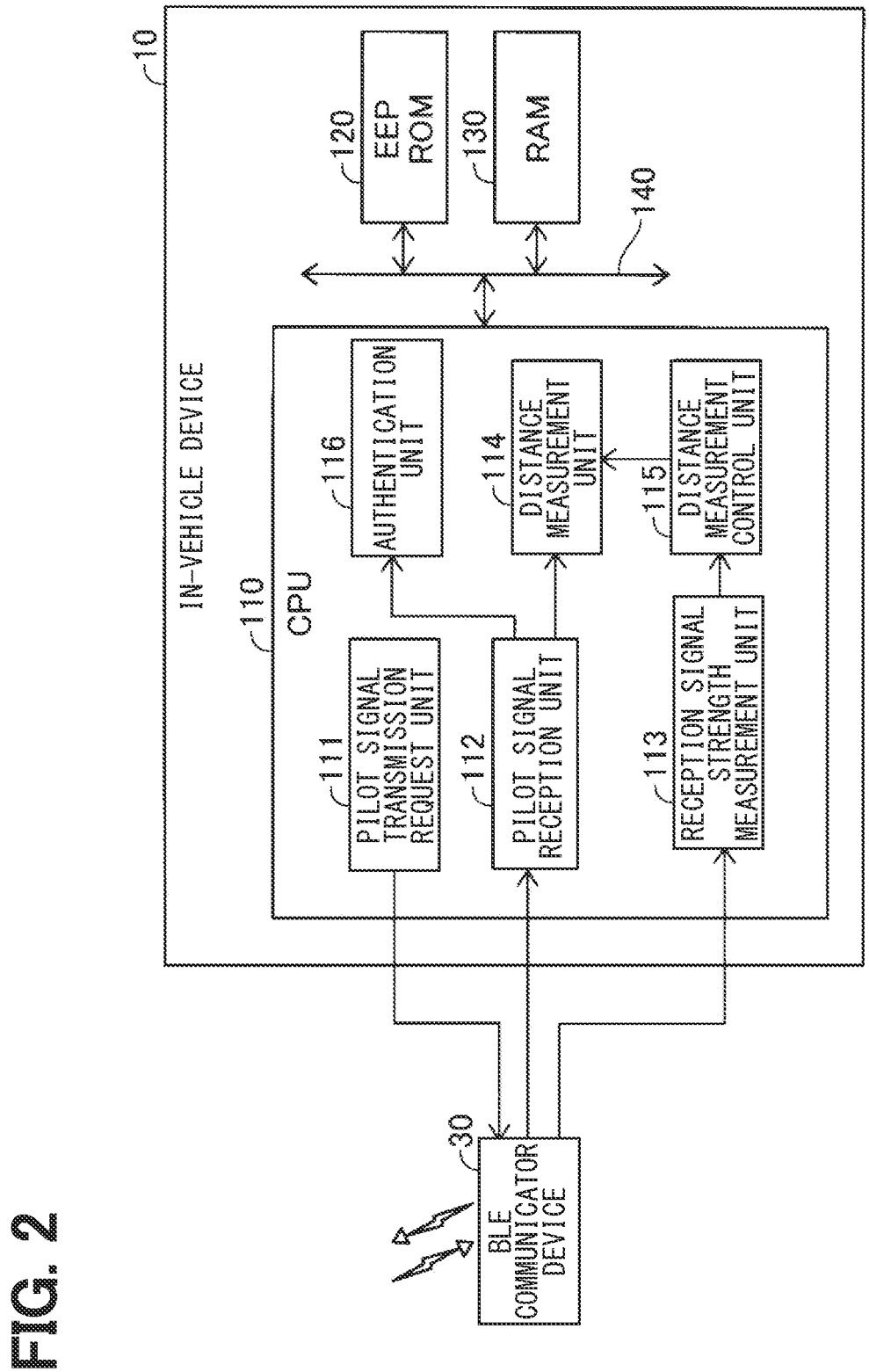
FIG. 2 is a block diagram showing a functional configuration of an in-vehicle device according to a first embodiment.

As shown in FIGS. 1 and 2, the vehicle 500 is equipped with the in-vehicle device 10 and the BLE communicator device 30. Since the BLE communicator device 30 has the same function as the BLE communicator device 23 included in the portable device 20 described above, detailed description thereof will be omitted.

As shown in FIG. 2, the in-vehicle device 10 is configured by an ECU (Electronic Control Unit), and has a configuration in which a CPU 110, an EEPROM 120, and a RAM 130 are connected to each other by an internal bus 140. The computer program for distance measurement and the computer program for the in-vehicle device are stored in the EEPROM 120 in advance. The CPU 110 functions as a pilot signal transmission request unit 111, a pilot signal reception unit 112, a reception signal strength measurement unit 113, a distance measurement unit 114, and a distance measurement control unit 115 by executing the computer program for distance measurement. Further, the CPU 110 functions as the authentication unit 116 by executing the computer program for the in-vehicle device.

The pilot signal transmission request unit 111 transmits the pilot signal described above to the portable device 20 via the BLE communicator device 30. The pilot signal reception unit 112 receives the pilot signal transmitted from the portable device 20 via the BLE communicator device 30. The reception signal strength measurement unit 113 measures the reception signal strength (RSSI: reception signal strength Indication) of the BLE radio signal received via the BLE communicator device 30.

The distance measurement unit 114 measures the distance between the in-vehicle device 10 and the portable device 20 by executing the distance measurement process described later. In the distance measurement process, the distance measurement is performed using BLE communication including transmission/reception of the pilot signals described above. The distance measurement control unit 115 controls the distance measurement process described later. The authentication unit 116 executes the control to realize the smart entry, in particular, the following processes. That is, the processes by the authentication unit 116 include: the transmission process to transmit a BLE radio signal using the BLE communicator device 30; the reception process to receive a BLE wireless signal transmitted from the portable device 20 as a response to the wireless signal by using the BLE communicator device 30; the authentication process to authenticate based on information such as the ID of the portable device 20 included in the received wireless signal; the instruction process to instruct the ECU for door open/close control to lock/unlock the door, open/close the door, in response to the successful authentication; and the instruction process to instruct the ECU for engine control to start or stop the engine.

In the distance measurement system 400 having the above configuration, the distance between the in-vehicle device 10 and the portable device 20 is measured by executing the distance measurement process described later. Generally, the propagation path of the radio signal between the in-vehicle device 10 and the portable device 20 corresponds to a so-called multipath, and there are a plurality of propagation paths. For example, there are a propagation path that directly propagates between the in-vehicle device 10 and the portable device 20, a propagation path that reflects on the ground, and the like. Further, suppose a case where the portable device 20 is located inside the vehicle 500. In such a case, in addition to the propagation path that directly propagates between the in-vehicle device 10 and the portable device 20, there is a propagation path that is reflected or diffracted by the steering wheel or instrument panel. The propagation path loss of the radio signal in such a multipath will be described with reference to FIG. 3.

Figure 3:
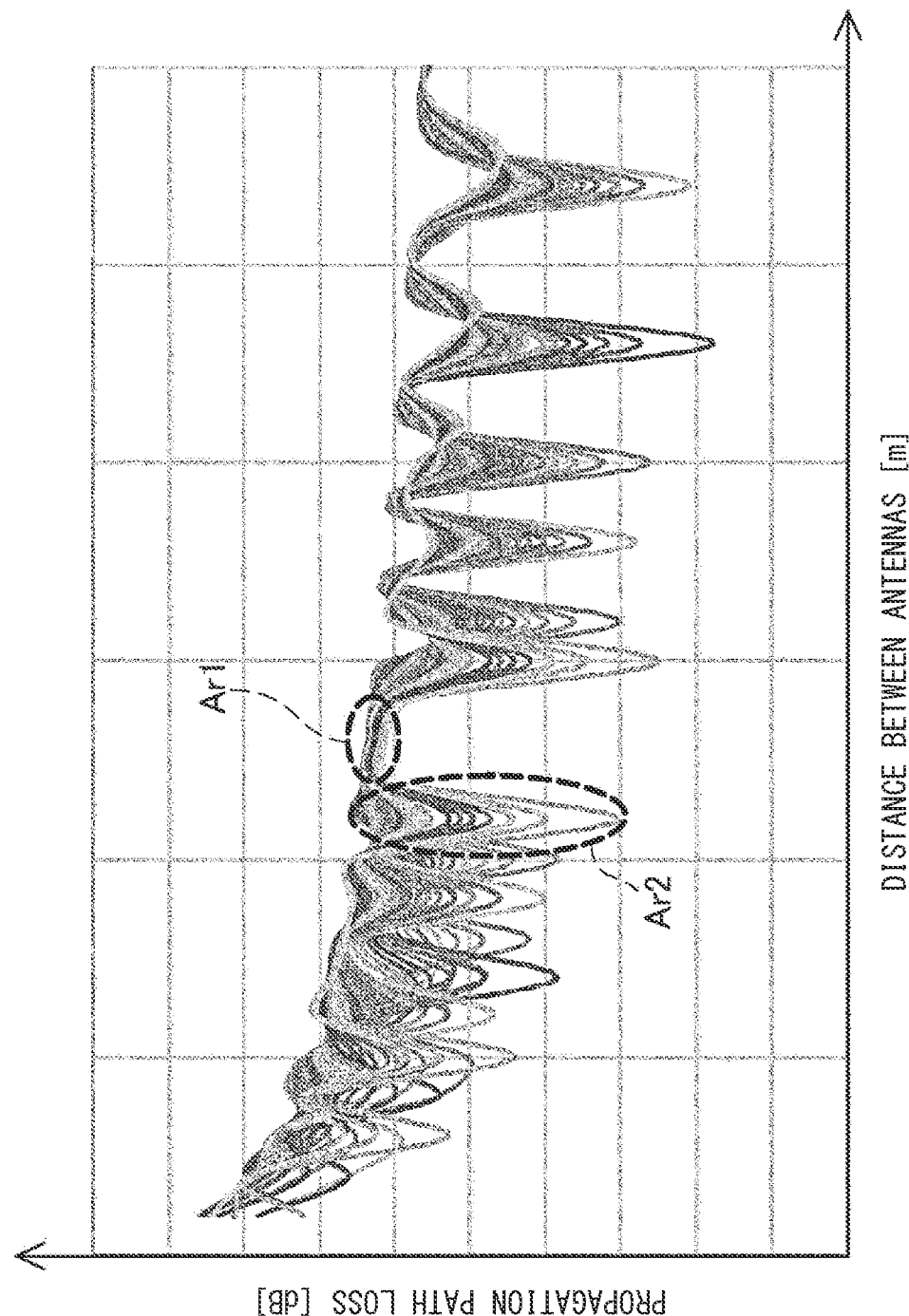
FIG. 3 is an explanatory diagram showing an example of propagation path loss when a radio signal is received by multipath.

In FIG. 3, the horizontal axis represents the distance between antennas (m); the vertical axis represents the propagation path loss (dB). The distance between the antennas on the horizontal axis means the distance between the antenna for BLE communication of the portable device 20 and the antenna for BLE communication of the in-vehicle device 10 (BLE communicator device 30). FIG. 3 illustrates the propagation path loss for each distance between antennas when a respective pilot signal is transmitted in each of channels of BLE communication in a two-wave multipath environment of a direct wave and a ground reflected wave.

As shown in FIG. 3, the change in the propagation path loss according to the distance between the antennas differs greatly depending on the respective channels. However, as in the region Ar1 of FIG. 3, there is a region in which the difference in propagation path loss in each of channels becomes very small. On the other hand, as in the region Ar2 in FIG. 3, there is a region in which the difference in propagation path loss in each of channels becomes very large. Suppose a case where the position of the portable device 20 is a position that causes the distance between the antennas to be included in the region Ar1. In this case, the differences in propagation path loss between the respective channels are very small; thus, the variation may not occur significantly between the distances obtained by the distance measurement process. On the other hand, suppose a case where the position of the portable device 20 is a position that causes the respective distance between the antennas to be included in the region Ar2. In this case, the respective differences in propagation path loss between the channel are very large; the variation may occur significantly between the respective distances obtained by the distance measurement process. Therefore, in the distance measurement process described later, the distance is measured when the distance between the antennas is included in the region Ar1, to enable the result of the distance measurement to provide a high accuracy. Hereinafter, a detailed description will be given with reference to FIGS. 4 to 6.

Figure 4:
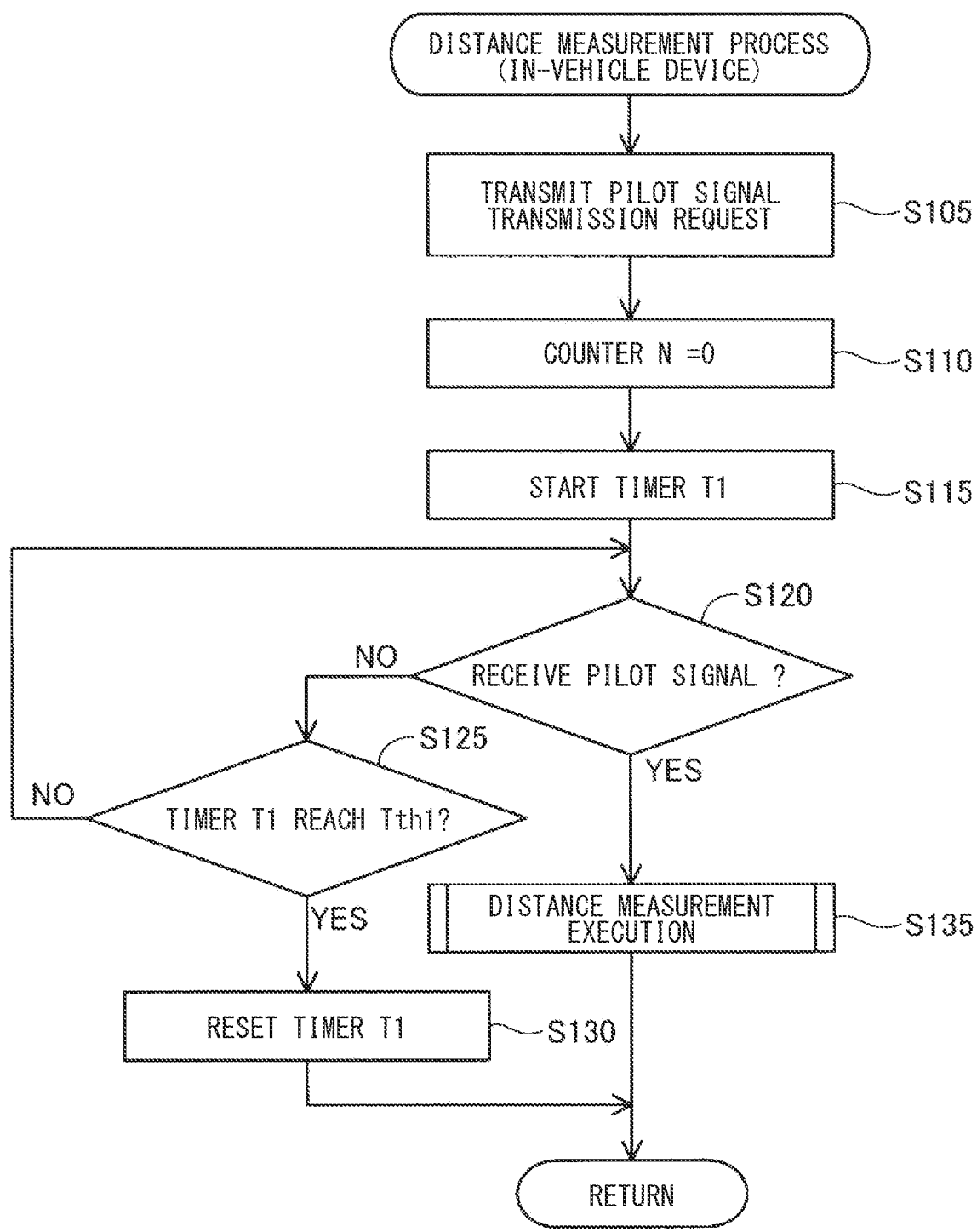
FIG. 4 is a flowchart showing steps of a distance measurement process in an in-vehicle device according to the first embodiment.
Figure 5:
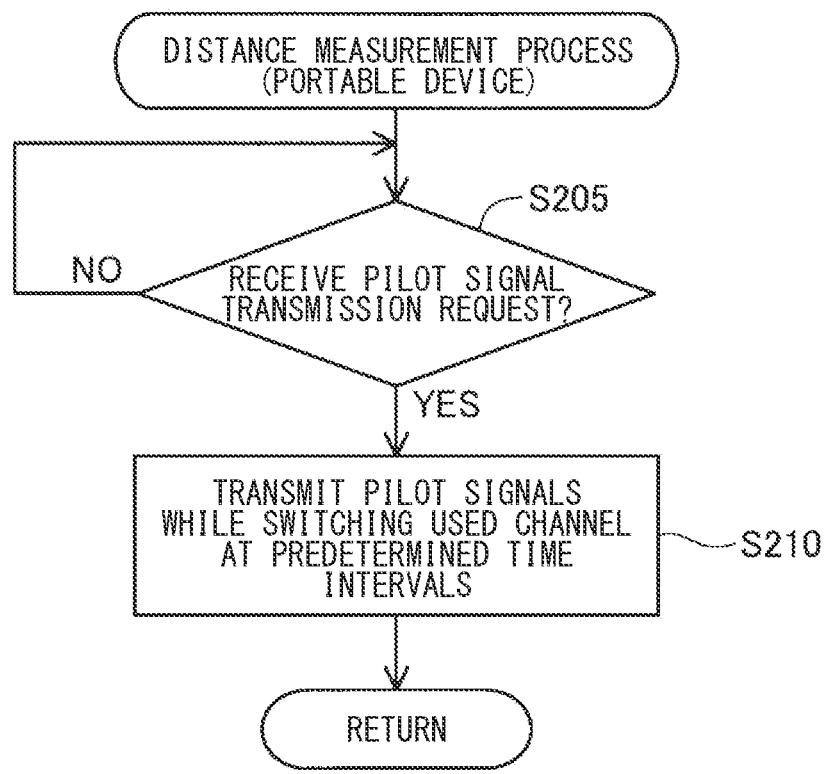
FIG. 5 is a flowchart showing steps of a distance measurement process in a portable device according to the first embodiment.

A2. Distance Measurement Process:

The distance measurement process in the in-vehicle device 10 shown in FIG. 4 is started when the power of the in-vehicle device 10 is turned on. Further, the distance measurement process in the portable device 20 shown in FIG. 5 is started when the power of the portable device 20 is turned on. When the portable device 20 uses a primary battery as a power source, the distance measurement process is executed when the primary battery is set in the portable device 20. As shown in FIG. 4, in the distance measurement process in the in-vehicle device 10, first, the pilot signal transmission request unit 111 transmits the pilot signal transmission request via the BLE communicator device 30 (step S105).

As shown in FIG. 5, in the distance measurement process in the portable device 20, the pilot signal transmission unit 211 first determines whether or not the pilot signal transmission request is received via the BLE communicator device 23 (step S205). When it is determined that the pilot signal transmission request is not received via the BLE communicator device 23 (step S205: NO), step S205 is executed again. That is, the pilot signal transmission unit 211 waits until the pilot signal transmission request is received.

Now, the pilot signal transmission unit 211 determines that the pilot signal transmission request is received via the BLE communicator device 23 (step S205: YES). Thereby, the pilot signal transmission unit 211 sequentially transmits pilot signals while switching the channel used in the 2.4 GHz radio frequency band in BLE communication in the order of channels 1, 2, 3, . . . at predetermined time intervals (step S210). In the present embodiment, the pilot signal transmission unit 211 transmits a respective pilot signal in each of the channels while sequentially switching between a total of five channels of channels 1 to 5. The pilot signal may be transmitted not only in these five channels but also in any number of channels. For example, the pilot signal may be transmitted on all channels 0 to 40. Further, the above-mentioned "predetermined time intervals" is 2 milliseconds in the present embodiment, but is not limited to 2 milliseconds and may be set to any time interval.

As shown in FIG. 4, the distance measurement control unit 115 sets the counter N to zero (step S110). The details of the counter N will be described later. The distance measurement control unit 115 starts the timer T1 (step S115). The timer T1 is a timer that measures the time elapsing after transmitting the pilot signal transmission request. The distance measurement control unit 115 determines whether or not a pilot signal has been received from the portable device 20 (step S120). When it is determined that the pilot signal is not received (step S120: NO), the distance measurement control unit 115 determines whether or not the timer T1 has reached a threshold time Tth1 (step S125). When it is determined that the timer T1 has reached the threshold time Tth1 (step S125: YES), the distance measurement control unit 115 resets the timer T1 (step S130). After the completion of step S130, the process returns to step S105 described above. On the other hand, when it is determined that the timer T1 has not reached the threshold time Tth1 (step S125: NO), the process returns to the above-mentioned step S120.

When it is determined in step S120 described above that the pilot signal is received (step S120: YES), the distance measurement is executed (step S135).

Figure 6:
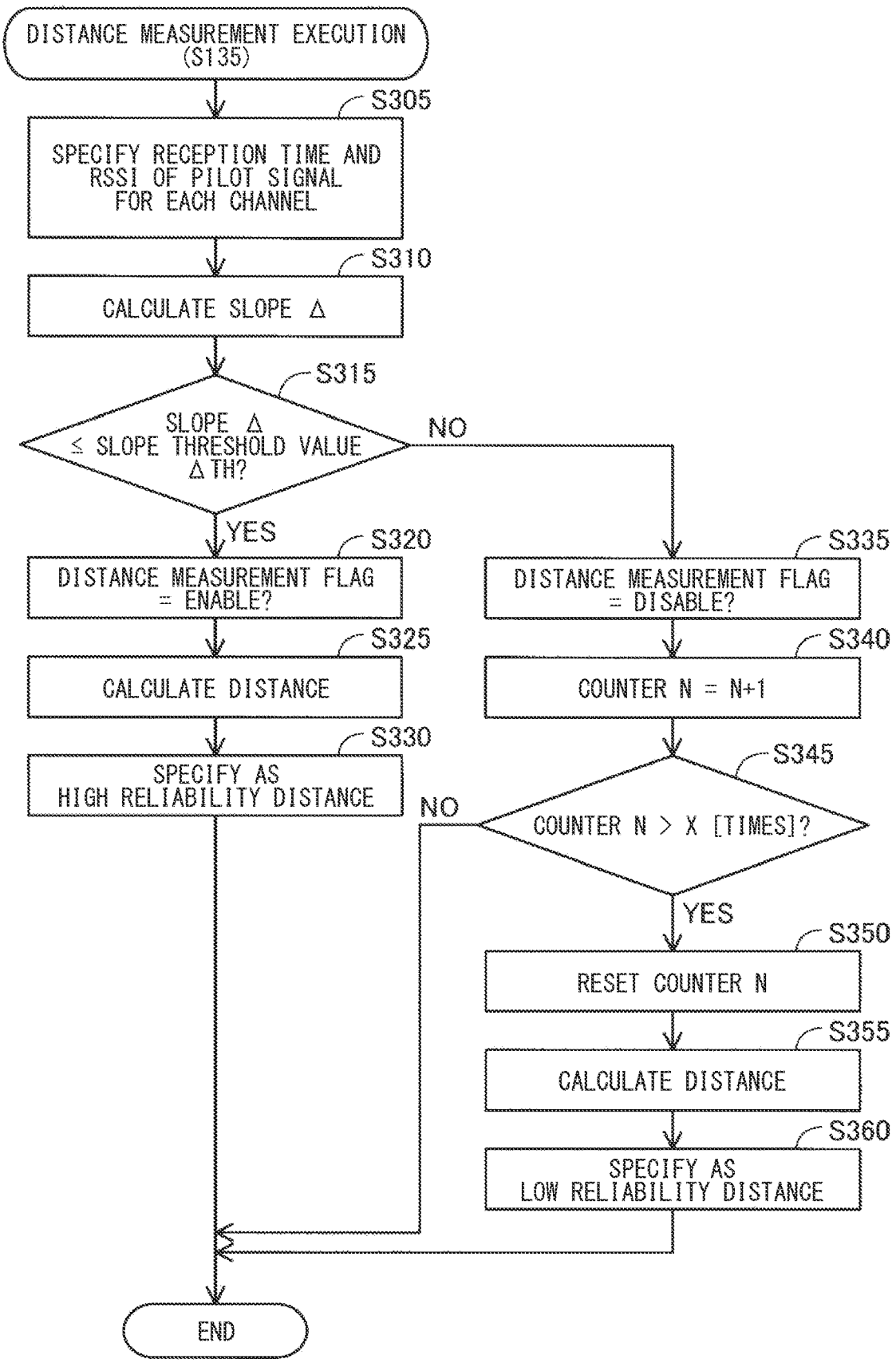
FIG. 6 is a flowchart showing detailed steps of a distance measurement execution (step S135) according to the first embodiment.

As shown in FIG. 6, the distance measurement control unit 115 specifies the reception time and the reception signal strength when receiving the pilot signals in each of the channels 1 to 5 (step S305). The distance measurement control unit 115 calculates the slope $\Delta$ of a straight line obtained by linearly approximating the time and the reception signal strength specified in step S305 (step S310). In this embodiment, the linear approximation in step S310 is realized by the least squares method. The slope $\Delta$ corresponds to a change in the reception signal strength per unit time.

Figure 7:
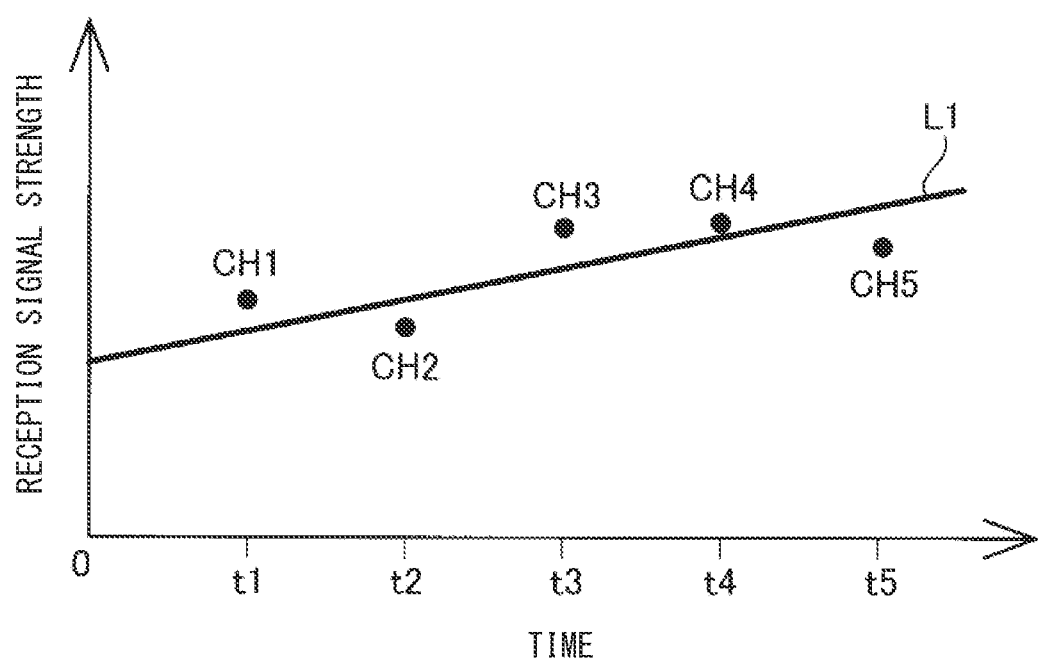
FIG. 7 is an explanatory diagram showing an example of the time and the reception signal strength specified in step S305 of the distance measurement process.

In the example of FIG. 7, the reception signal strength of the pilot signal of channel 1 is specified at time t1. Similarly, the reception signal strength of the pilot signal of channel 2 is specified at time t2. The reception signal of the pilot signal of channel 3 is specified at time t3. The reception signal strength of the pilot signal of the channel 4 is specified at time t4. The reception signal strength of the pilot signal of the channel 5 is specified at time t5. Then, the straight line L1 is obtained by linear approximation, and the slope $\Delta$ of the straight line L1 is calculated.

Here, when the propagation path loss (gain of the radio signal) becomes low, the reception signal strength becomes low. On the other hand, when the propagation path loss becomes high, the reception signal strength becomes high. Therefore, when the distance between the portable device 20 and the in-vehicle device 10 is a distance included in the region Ar2 shown in FIG. 3, the variation in the reception signal strengths for the respective channels 1 to 5 becomes very large as well as that in the propagation path losses for the respective channels 1 to 5. Then, in this case, the slope $\Delta$ of the straight line L1 is calculated as a very large value. On the other hand, when the distance between the portable device 20 and the in-vehicle device 10 is included in the region Ar1 shown in FIG. 3, the variation in the reception signal strengths for the respective channels 1 to 5 becomes very small as that in the propagation path losses of the respective channels 1 to 5. Then, in this case, the slope $\Delta$ of the straight line L1 is calculated as a very small value.

As shown in FIG. 6, when the slope $\Delta$ is calculated, the distance measurement control unit 115 determines whether or not the slope $\Delta$ is equal to or less than the slope threshold value $\Delta$th (step S315). When it is determined that the slope $\Delta$ is equal to or less than the slope threshold value $\Delta$th (step S315: YES), the distance measurement control unit 115 sets the distance measurement enable/disable flag to "enable" (step S320). The distance measurement enable/disable flag is a flag for controlling whether or not the calculation of the distance between the in-vehicle device 10 and the portable device 20 is enabled to be executed. When the flag is "enable", the distance measurement unit 114 can calculate the distance, while when the flag is "disable", the distance measurement unit 114 cannot calculate the distance. It should be noted that the fact that the slope $\Delta$ is determined to be equal to or less than the slope threshold value $\Delta$th and the distance measurement enable/disable flag is "enable" corresponds to the "allowable condition" in the present disclosure.

The distance measurement unit 114 calculates the distance between the in-vehicle device 10 and the portable device 20 by using the pilot signals received in any two channels of channels 1 to 5 (step S325). Specifically, the distance measurement unit 114 obtains the distance R between the in-vehicle device 10 and the portable device 20 by using the following expression (1).

$$\theta d = 2 \times \pi \times fd(R/c) \quad (1)$$

In the above expression (1), fd indicates the difference (difference frequency) between the frequencies of the two pilot signals; θd indicates the phase of the difference frequency fd when the pilot signals are received; and c indicates the speed of light.

The distance measurement control unit 115 specifies the distance calculated in step S325 as a distance calculated with high reliability (hereinafter, referred to as "high reliability distance") and stores it in the EEPROM 120 (step S330). This "high reliability" means that the reliability is relatively high as compared with the distance calculated in step S355 described later.

In step S315 described above, when it is determined that the slope Δ is not equal to or less than the slope threshold value Δth (step S315: NO), the distance measurement control unit 115 sets the distance measurement enable/disable flag to "disable" (step S335). The distance measurement control unit 115 increments the counter N by one (step S340). The distance measurement control unit 115 determines whether or not the counter N is larger than a predetermined threshold value X (step S345). When it is determined that the counter N is not larger than the predetermined threshold value X (step S345: NO), step S135 is ended, and the process returns to step S105 as shown in FIG. 4. Therefore, after that, when the pilot signal is received from the portable device 20 before the timer T1 expires, step S135 will be executed again. Then, in step S135 to be executed again, when it is determined that the slope Δ is not equal to or less than the slope threshold value Δth (step S315: NO), step S340 is executed, and the counter N is further increased by one. In this way, when it is repeatedly determined that the slope Δ is not equal to or less than the slope threshold value Δth, the counter N increases repeatedly. When the slope Δ thereby becomes larger than the threshold value X (step S345: YES), the distance measurement control unit 115 resets the counter N (step S350). The distance measurement unit 114 calculates the distance between the in-vehicle device 10 and the portable device 20 by using the pilot signals received in any two channels of channels 1 to 5 (step S355). Since the process of step S355 is the same as the process of step S325 described above, detailed description thereof will be omitted.

The distance measurement control unit 115 specifies the distance calculated in step S355 as a distance calculated with low reliability (hereinafter, referred to as "low reliability distance") and stores it in the EEPROM 120 (step S360). This "low reliability" means that the reliability is relatively low compared with the distance calculated in step S325 described above.

After the completion of step S360, step S135 is ended, and as shown in FIG. 4, the process returns to step S105. According to the distance measurement process described above, when the distance between the in-vehicle device 10 and the portable device 20 is included in the region as shown in the region Ar1 of FIG. 3, a high reliability distance is specified. The high reliability distance calculated in this way can be used in each service of the smart entry, in which a high reliability distance is required as the distance between the in-vehicle device 10 and the portable device 20. For example, a high reliability distance is used in a service that automatically adjusts the position and angle of the driver's seat to a preset value only when the portable device 20 is around the driver's seat. On the other hand, when the distance between the in-vehicle device 10 and the portable device 20 is included in the region as shown in the region Ar2 in FIG. 3, the counter N becomes X, which is the threshold value. Thereby a low reliability distance is specified. The low reliability distance calculated in this way can be used for services of the smart entry services sufficient with the low reliability distance as the distance between the in-vehicle device 10 and the portable device 20. For example, the portable device 20 enters from the outside to the inside within a range of 1.5 m from the vehicle 500 (antenna of the BLE communicator device 30). In this case, the low reliability distance can be used in services such as automatically unlocking the door of the vehicle 500 and turning on the light of the vehicle 500.

According to the distance measurement system 400 of the first embodiment described above, the followings can be achieved. The measurement results of the reception signal strengths of the pilot signals of the respective channels (respective frequency) are used. It is determined whether or not the slope Δ of the straight line obtained by linearly approximating the time and the reception signal strength of the pilot signal is equal to or less than the predetermined slope threshold value Δth. When it is determined that the slope Δ is equal to or less than the slope threshold value Δth, the distance obtained from the distance measurement process executed by the distance measurement unit 114 is specified as the high reliability distance. Therefore, the distance obtained when the slope of the straight line is equal to or less than the slope threshold value Δth and the variation in the reception signal strength caused by the interference of the pilot signal due to multipath is small can be set as the high reliability distance. At this time, it is not necessary to transmit and receive the pilot signals a plurality of times for each channel (each frequency). Therefore, in the distance measurement system 400 including the in-vehicle device 10 and the portable device 20, the distance measurement can be performed accurately in a short period of time with low power consumption. On the other hand, when it is determined that the slope Δ is not equal to or less than the slope threshold value Δth, the distance obtained by causing the distance measurement unit 114 to execute the distance measurement process is not specified as the high reliability distance. Therefore, the distance obtained when the slope Δ is not equal to or less than the slope threshold value Δth and the variation in the reception signal strength caused by the interference of the pilot signal due to multipath is not small can be specified as the low reliability distance. Therefore, even in this case, the distance measurement system 400 including the in-vehicle device 10 and the portable device 20 can perform distance measurement accurately in a short period of time and with low power consumption.

Further, when it is determined that the slope Δ is not equal to or less than the slope threshold value Δth, and such determination is continued X times, the distance measurement process is executed by the distance measurement unit 114, to specify the obtained distance as the low reliability distance. Therefore, it is possible to suppress that the distance is not measured at all when there is large variation in the reception signal strength due to the interference of the pilot signal due to multipath. Moreover, the distance measured in such a case can be specified as a low reliability distance. Therefore, it is possible to provide a measured distance to a process (service) for which a low reliability distance is available.

Further, the portable device 20 sequentially transmits pilot signals while switching the used channel at predetermined time intervals. Therefore, as compared with the configuration in which pilot signals are transmitted through a plurality of channels at the same time, it is not necessary to prepare a plurality of BLE communicator devices, and the manufacturing cost of the portable device 20 can be suppressed. In addition, in a configuration in which pilot signals are transmitted through multiple channels at the same time, the reception signal strength can be obtained for each channel at the same time. Therefore, it is necessary to determine whether or not the distance can be measured accurately with little influence of multipath based on the width of the reception signal strength (difference between the maximum value and the minimum value) or the average value. However, the width or average value of the reception signal strength fluctuates greatly when one of the values of the plurality of reception signal strengths becomes an abnormal value due to some influence. There is a risk of erroneous determination as to whether or not the distance can be measured accurately with little influence of multipath. On the other hand, in the present embodiment, the determination is made based on the slope Δ. Therefore, even when one of the values of the plurality of reception signal strengths becomes an abnormal value due to some influence, the fluctuation can be suppressed to be small compared with the case where all the reception signal strengths are normal values. Therefore, it is possible to accurately determine whether or not the distance can be measured accurately with little influence of multipath.

B. Second Embodiment

Figure 8:
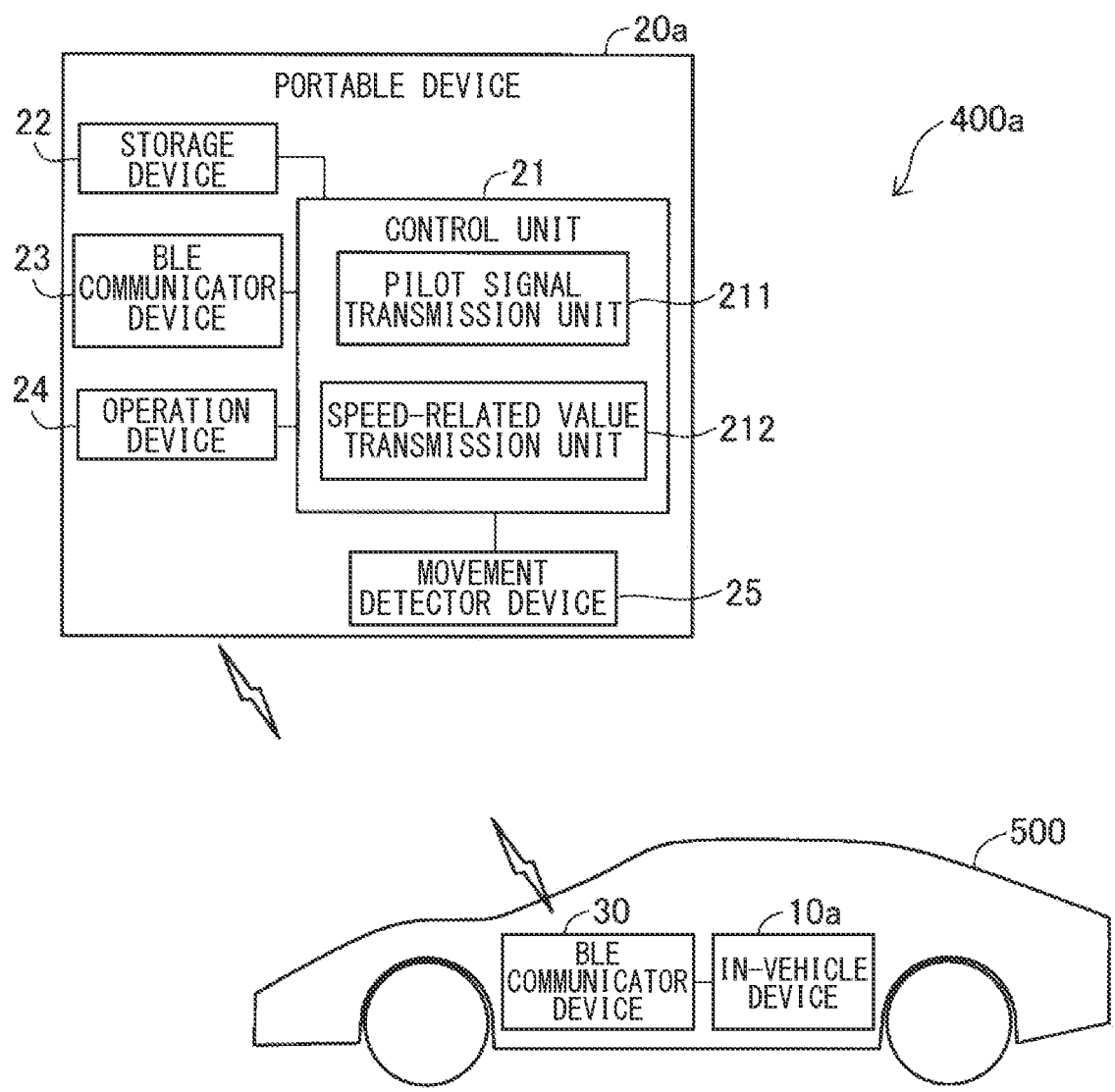
FIG. 8 is an explanatory diagram showing a schematic configuration of a distance measurement system according to a second embodiment.
Figure 9:
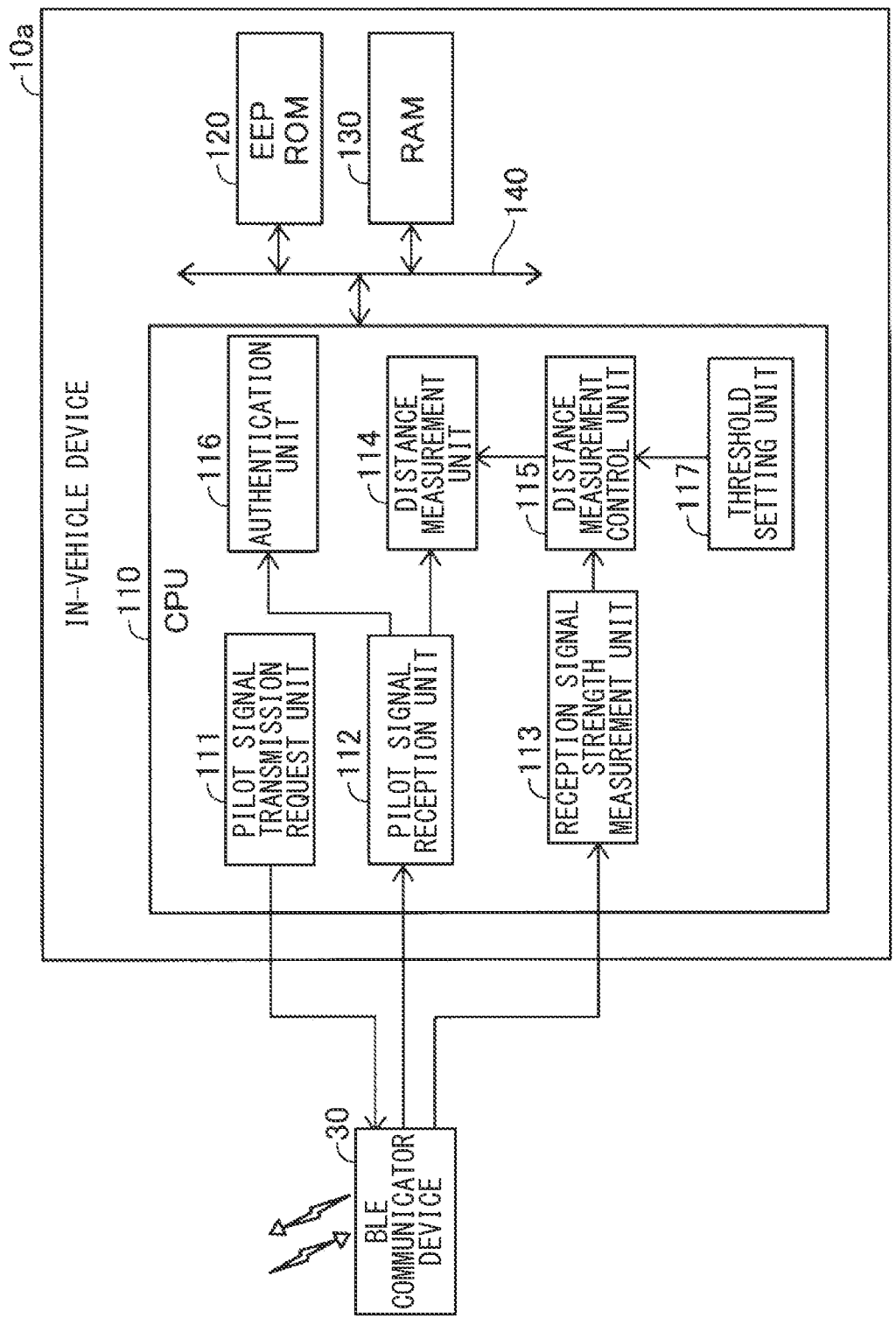
FIG. 9 is a block diagram showing a functional configuration of an in-vehicle device according to the second embodiment.

B1. System Configuration:

The configuration of the distance measurement system 400a of the second embodiment shown in FIG. 8 is different from the configuration of the distance measurement system 400 according to the first embodiment in that (i) the portable device 20a is provided in place of the portable device 20, as shown in FIG. 8 and (ii) the in-vehicle device 10a is provided in place of the in-vehicle device 10, as shown in FIG. 9. Since the other configurations of the distance measurement system 400a are the same as those of the distance measurement system 400, the same components are designated by the same reference signs, and detailed description thereof will be omitted.

As shown in FIG. 8, the portable device 20a is different from the portable device 20 in that a movement detector device 25 is provided and the control unit 21 also functions as a speed-related value transmission unit 212. Since the other configurations of the portable device 20a are the same as those of the portable device 20, the same components are designated by the same reference signs, and detailed description thereof will be omitted. The movement detector device 25 detects a value (hereinafter, referred to as a "speed-related value") related to the movement speed of the portable device 20a. In the present embodiment, the speed-related value means acceleration; the movement detector device 25 is configured by an acceleration sensor. The higher the movement speed of the portable device 20a, the higher the acceleration detected by the movement detector device 25. The movement detector device 25 may be configured by a vibration sensor with the speed-related value as the vibration frequency. Further, for example, the speed-related value may be set as the speed; the movement detector device 25 may be configured by a speed sensor.

The speed-related value transmission unit 212 transmits the speed-related value detected by the movement detector device 25 to the in-vehicle device 10a via the BLE communicator device 23.

As shown in FIG. 9, the in-vehicle device 10a is different from the in-vehicle device 10 of the first embodiment in that the CPU 110 also functions as a threshold setting unit 117. Since the other configurations of the in-vehicle device 10a are the same as those of the in-vehicle device 10, the same components are designated by the same reference signs, and detailed description thereof will be omitted. The threshold setting unit 117 sets a corresponding threshold value. The corresponding threshold value is a threshold value set for the speed-related value. It means a threshold value corresponding to a predetermined threshold speed with respect to the movement speed of the portable device 20a in order to determine whether the portable device 20a is in a moving state or a stationary state. For example, suppose a case where when the movement speed of the portable device 20a is 0.3 m/sec or more, the portable device 20a is determined to be in the moving state, and when the movement speed is less than 0.3 m/sec, the portable device 20a is determined to be in the stationary state. In this case, the acceleration specified in advance by experiments or the like as the acceleration generated when the portable device 20a moves at the threshold speed of 0.3 m/sec corresponds to the corresponding threshold value. Although the initial value of the corresponding threshold value is set in advance, the corresponding threshold value can be updated by the threshold setting unit 117 as described later.

Figure 10:
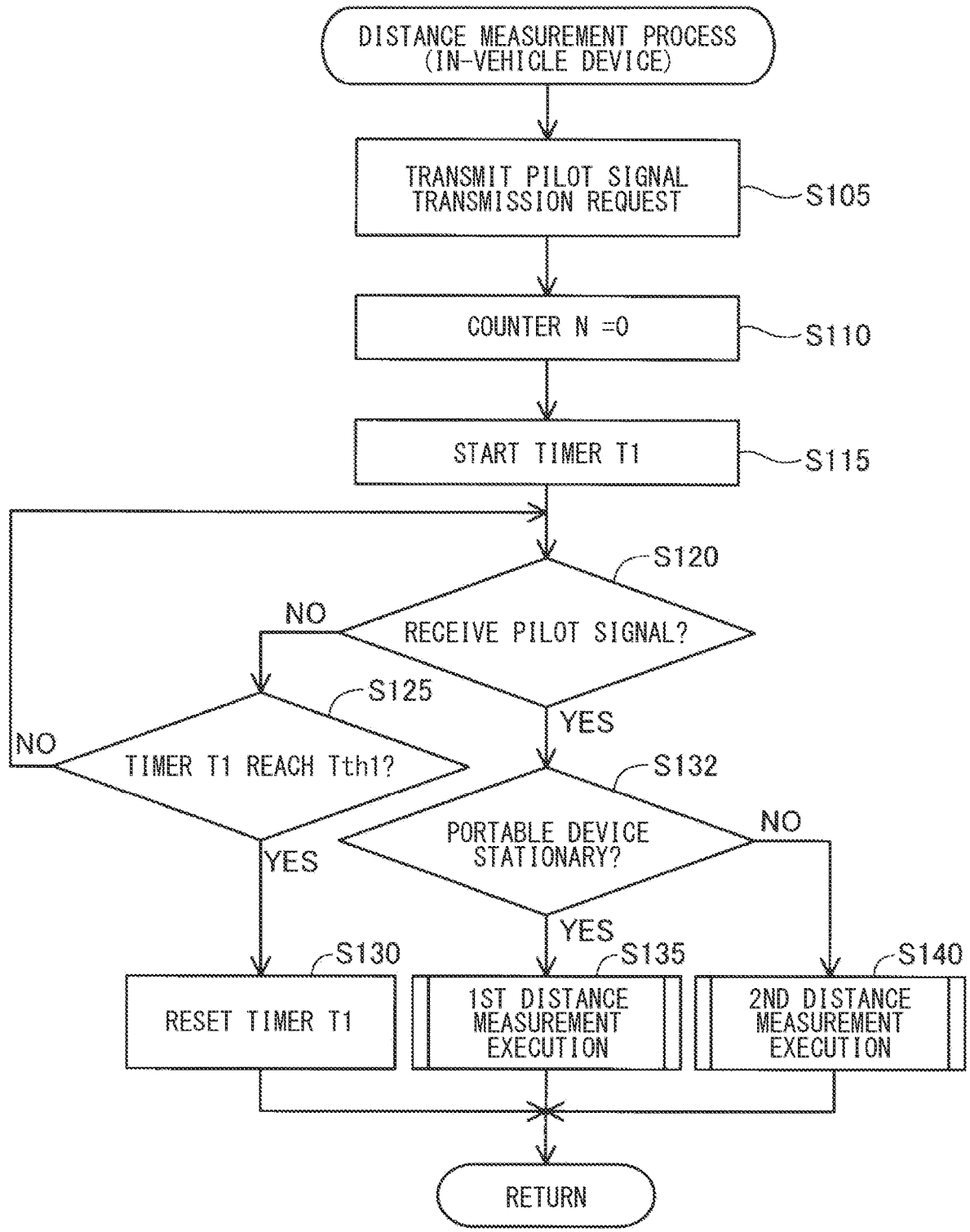
FIG. 10 is a flowchart showing steps of a distance measurement process in an in-vehicle device according to the second embodiment.

B2. Distance Measurement Process:

The distance measurement process in the in-vehicle device 10a shown in FIG. 10 is different from the distance measurement process in the in-vehicle device 10 of the first embodiment shown in FIG. 4 in that steps S132 and S140 are additionally executed. The other steps of the distance measurement process in the in-vehicle device 10a of the second embodiment is the same as the distance measurement process in the in-vehicle device 10 of the first embodiment. Therefore, the same steps are denoted by the same reference signs, and detailed description thereof will be omitted.

In addition, the steps of the distance measurement process in the portable device 20a of the second embodiment is the same as those of the distance measurement process in the portable device 20 of the first embodiment except that (i) in step S210 shown in FIG. 5, when transmitting the pilot signal, the speed-related value transmission unit 212 also transmits the detection result (i.e., the acceleration which is the speed-related value) of the movement detector device 25 to the in-vehicle device 10a.

Now, it is determined that the pilot signal has been received in step S120 shown in FIG. 10 (step S120: YES). Thereby the distance measurement control unit 115 determines whether or not the portable device 20a is in a stationary state by using a speed-related value transmitted (i.e., acceleration) from the portable device 20a together with the pilot signal (step S132). Specifically, the distance measurement control unit 115 determines that the received acceleration is lower than the corresponding threshold value, and determines that the portable device 20a it is in the moving state when it is equal to or higher than the corresponding threshold value. It should be noted that the fact that (i) the portable device 20a is determined to be in a stationary state, (ii) the slope Δ is equal to or less than the slope threshold value Δth, and (iii) the distance measurement enable/disable flag is "enable" corresponds to the "allowable condition" in the present disclosure.

When it is determined that the portable device 20a is in a stationary state (step S132: YES), the first distance measurement is executed (step S135). The first distance measurement is the same process as the distance measurement in step S135 in the first embodiment shown in FIG. 6. In the present embodiment, in order to distinguish it from the second distance measurement described later, it is referred to as "first distance measurement" instead of the distance measurement.

When it is determined in step S132 that the portable device 20a is not in a stationary state (step S132: NO), the second distance measurement is executed (step S140).

Figure 11:
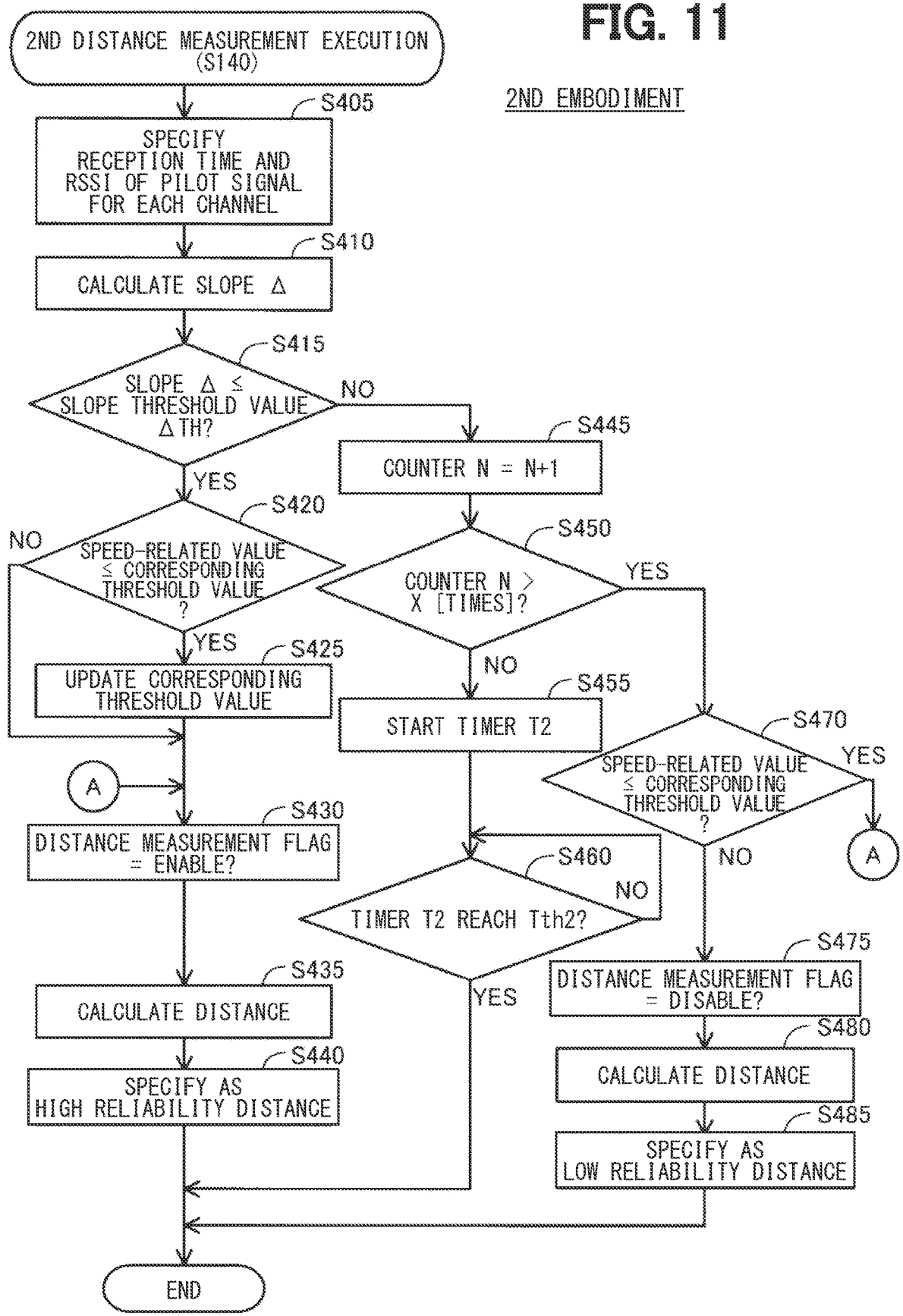
FIG. 11 is a flowchart showing steps of a second distance measurement execution according to the second embodiment.

As shown in FIG. 11, in the second distance measurement, steps S405, S410, and S415 are first executed. Step S405 is the same as step S305 in the distance measurement (step S135) of the first embodiment shown in FIG. 6. Further, step S410 is the same as step S310 shown in FIG. 6, and step S415 is the same as step S315 shown in FIG. 6.

When it is determined in step S415 described above that the slope Δ is equal to or less than the slope threshold value Δth (step S415: YES), the distance measurement control unit 115 determines whether or not the speed-related value is equal to or less than the corresponding threshold value (step S420). Unless step S425, which will be described later, is executed, the initial value is used as the corresponding threshold value.

In step S420 described above, when it is determined that the speed-related value is equal to or less than the corresponding threshold value (step S420: YES), the threshold setting unit 117 updates the corresponding threshold value with the received speed-related value that was the target for the determination in step S420 (step S425). When the slope Δ is equal to or less than the slope threshold value Δth and the speed-related value is equal to or less than the corresponding threshold value, the corresponding threshold value is updated according to the received speed-related value. This allows the high reliability distance to be specified only when a more reliable distance can be measured.

After the completion of the above-mentioned step S425, or when it is determined in the above-mentioned step S420 that the speed-related value is not equal to or less than the corresponding threshold value (step S420: NO), steps S430, S435, and S440 are executed. Step S430 is the same as step S320 shown in FIG. 6. Further, step S435 is the same as step S325 shown in FIG. 6, and step S440 is the same as step S330 shown in FIG. 6.

When it is determined in step S415 described above that the slope Δ is not equal to or less than the slope threshold value Δth (step S415: NO), steps S445 and S450 are executed. Step S445 is the same as step S340 shown in FIG. 6. Further, step S450 is the same as step S345 shown in FIG. 6.

When it is determined in step S450 that the counter N is not larger than the predetermined threshold value X (step S450: NO), the distance measurement control unit 115 starts the timer T2 (step S455). The distance measurement control unit 115 determines whether or not the timer T2 has reached the threshold time Tth2 (step S460). When it is determined that the timer T2 has not reached the threshold time Tth2 (step S460: NO), step S460 is executed again. That is, the process waits until the timer T2 reaches the threshold time Tth2. Then, when it is determined that the timer T2 has reached the threshold time Tth2 (step S460: YES), the second distance measurement is completed, and the process returns to step S105 as shown in FIG. 10. As described above, the timer T2 corresponds to a timer for measuring the standby time until the steps S105 to S140 are executed again while the portable device 20a is in the moving state.

As shown in FIG. 11, when it is determined in step S450 described above that the counter N is larger than the predetermined threshold value X (step S450: YES), the distance measurement control unit 115 determines whether or not the speed-related value is equal to or less than the corresponding threshold value (step S470). This step S470 is the same process as step S420 described above.

When it is determined in step S470 that the speed-related value is equal to or less than the corresponding threshold value (step S470: YES), the above-mentioned steps S430 to S440 are executed. Therefore, in this case, the high reliability distance is specified by the following reason. That is, even in cases that the slope Δ is not equal to or less than the slope threshold value Δth X times in a row, there is a high possibility that the portable device 20a is in a stationary state when the speed-related value is equal to or less than the corresponding threshold value. Under such a situation, the calculated distance can be treated as a relatively reliable distance. Note that, in this case, since step S425 is not executed, the corresponding threshold value is not updated by the following reason. That is, the slope Δ is not equal to or less than the slope threshold value Δth. Under such a situation, if the corresponding threshold value is updated with the speed-related value (i.e., acceleration), there is a possibility that an appropriate corresponding threshold value will not be set.

In step S470 described above, when it is determined that the speed-related value is not equal to or less than the corresponding threshold value (step S470: NO), steps S475, S480, and S485 are executed. Step S475 is the same as step S335 of FIG. 6. Further, step S480 is the same as S355 in FIG. 6, and step S485 is the same as step S360 in FIG. 6. After the completion of step S485, the process returns to step S105, as shown in FIGS. 10 and 11.

The distance measurement system 400a of the second embodiment described above has the same effect as the distance measurement system 400 of the first embodiment. In addition, when it is determined that the speed-related value (acceleration of the portable device 20a) is equal to or less than the corresponding threshold value, the distance measurement unit 114 is made to perform the first distance measurement. Therefore, in a state where the portable device 20a has not moved and the reception signal strength is stable without significant change with the passage of time, the measured distance can be specified as either a low reliability distance or a high reliability distance. Therefore, the measured distance can be specified as either a low reliability distance or a high reliability distance with high reliability.

Further, in the second distance measurement, when it is determined that the slope Δ is not equal to or less than the slope threshold value Δth, step S105 is executed again after waiting for the expiration of the timer T2. Therefore, when the portable device 20a is in the moving state, there is a possibility that the distance between the portable device 20a and the in-vehicle device 10a corresponds to a stable distance with little variation in the reception signal strength for each channel as shown in the region Ar1 in FIG. 3, and the slope Δ is equal to or less than the slope threshold value Δth. Further, even when the determination of the slope Δ (step S415) is executed X times in succession, if the speed-related value is equal to or less than the corresponding threshold value, the calculated distance is specified as the high reliability distance. Further, when the speed-related value is larger than the corresponding threshold value, the calculated distance is specified as the low reliability distance. Therefore, it can be suppressed that the distance is not calculated at all.

Further, when the slope Δ is equal to or less than the slope threshold value Δth and the speed-related value is equal to or less than the corresponding threshold value, the corresponding threshold value is updated according to the received speed-related value. Therefore, the high reliability distance can be specified only when a more reliable distance can be measured.

C. Third Embodiment

Figure 12:
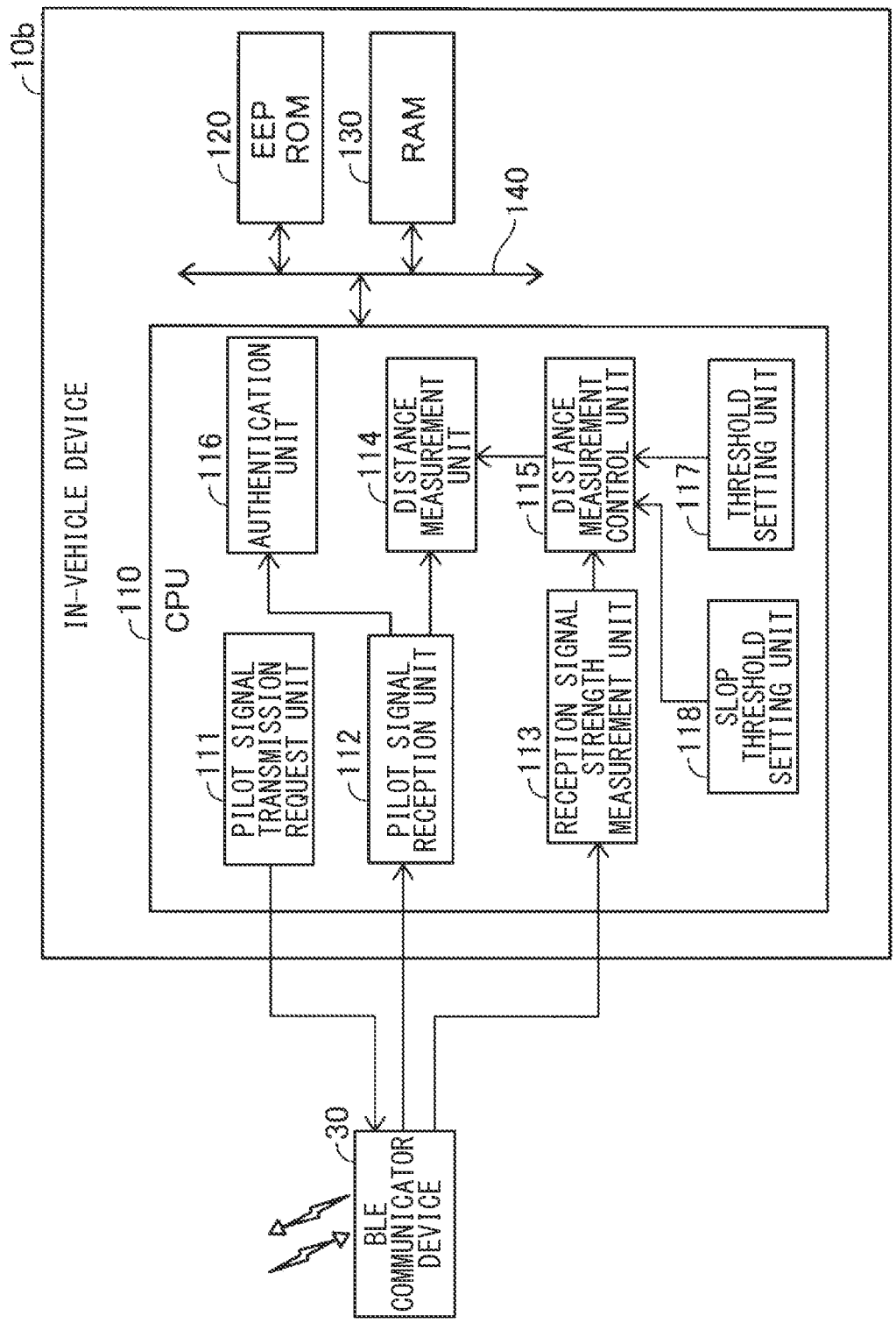
FIG. 12 is a block diagram showing a functional configuration of an in-vehicle device according to a third embodiment.

The distance measurement system of a third embodiment is the same as the distance measurement system 400a of the second embodiment except that the in-vehicle device 10b shown in FIG. 12 is provided instead of the in-vehicle device 10a. Therefore, the same components are designated by the same reference signs, and detailed description thereof will be omitted. The in-vehicle device 10b is different from the in-vehicle device 10a of the second embodiment in that the CPU 110 functions as a slope threshold setting unit 118. Since the other configurations of the in-vehicle device 10b are the same as those of the in-vehicle device 10a, the same components are designated by the same reference signs, and detailed description thereof will be omitted. The slope threshold setting unit 118 executes a slope threshold setting process, which is a process for setting the slope threshold Δth described above.

Figure 13:
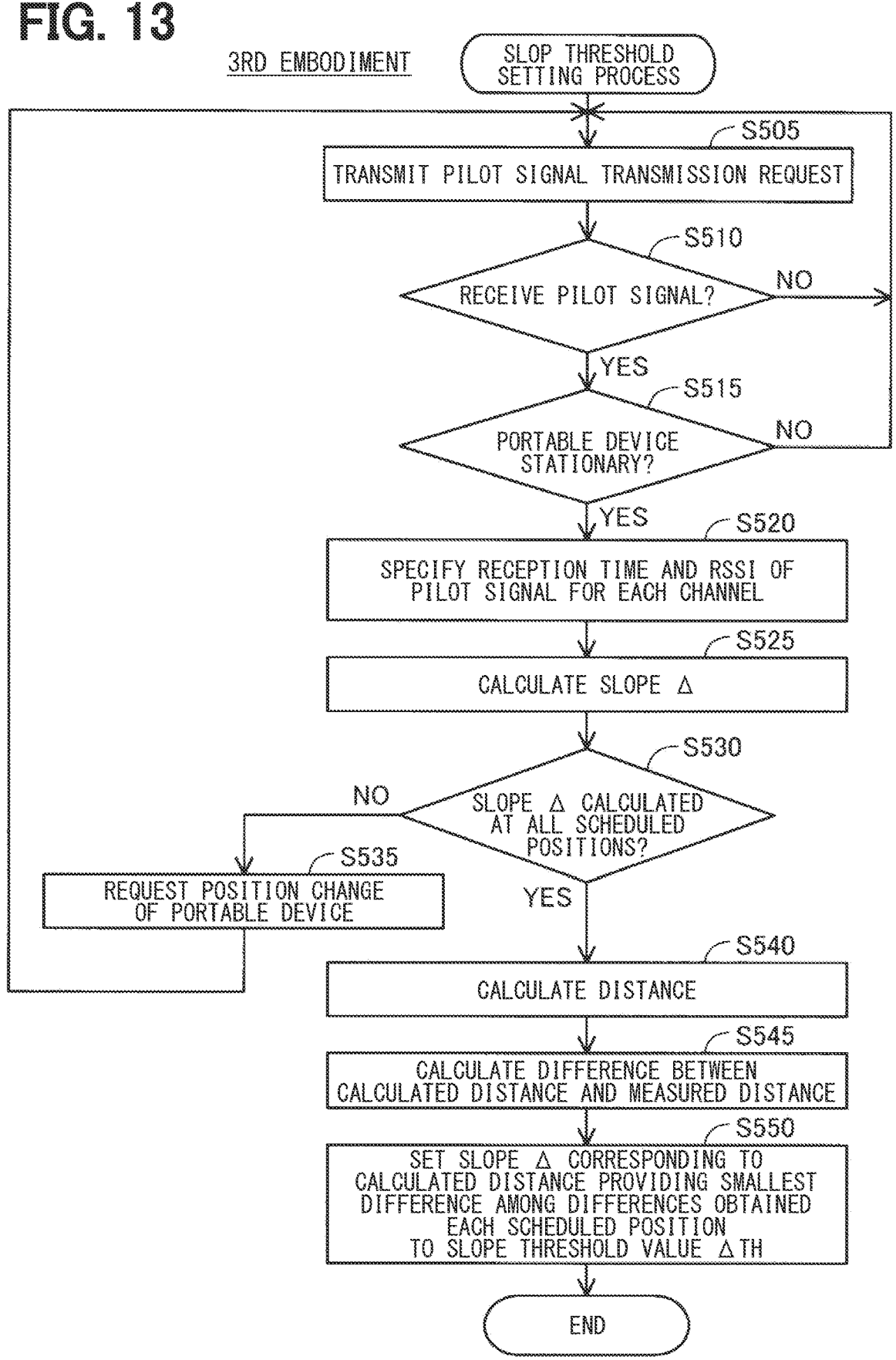
FIG. 13 is a flowchart showing steps of a slope threshold setting process according to the third embodiment.

In the distance measurement system 400a of the third embodiment, in addition to the distance measurement processing described above, a slope threshold setting process is executed. The slope threshold setting process is executed to set an appropriate slope threshold Δth according to the actual usage environment of the vehicle 500, and is executed, for example, at the time of manufacturing the vehicle 500. For example, on the touch panel mounted on the instrument panel of the vehicle 500, when the worker selects the slope threshold setting menu and commands the execution, the slope threshold setting process shown in FIG. 13 is executed. At this time, the power of the portable device 20a is turned on. Therefore, in the portable device 20a, the distance measurement process in the portable device shown in FIG. 5 is executed. In the following description, the portable device 20a will be described as being present (positioned) in the passenger compartment of the vehicle 500, but may be present outside the passenger compartment.

As shown in FIG. 13, first, step S505 is executed. This step S505 is the same as step S105 of the second embodiment shown in FIG. 10. The distance measurement control unit 115 determines whether or not a pilot signal has been received from the portable device 20a (step S510). This step S510 is the same as step S120 of the second embodiment shown in FIG. 10. When it is determined that the pilot signal is received (step S510: YES), the distance measurement control unit 115 determines whether or not the portable device 20a is in a stationary state (step S515).

When it is determined in step S510 described above that the pilot signal is not received (step S510: NO), or when it is determined in step S515 described above that the portable device 20a is not in a stationary state (step S515: NO), the process returns to step S505 described above. On the other hand, when it is determined that the portable device 20a is in a stationary state (step S515: YES), steps S520 and S525 are executed. Step S520 is the same as S405 shown in FIG. 11. Further, step S525 is the same as step S410 shown in FIG. 11. After the completion of step S525, the distance measurement control unit 115 determines whether or not the slope Δ has been calculated at all the scheduled positions (step S530). In the present embodiment, the "scheduled positions" is predetermined positions in the passenger compartment of the vehicle 500, where it is assumed that the user will place the portable device 20a. For example, the position between the driver's seat and the passenger seat, the position of the foot of the driver's seat, the position of the storage shelf formed on the instrument panel, the position of the passenger seat, and the like are applicable.

When it is determined that the slope Δ has not been calculated at all the planned positions (step S530: NO), the distance measurement control unit 115 requests the worker to change the position of the portable device 20a (step S535). In the present embodiment, in step S535, the distance measurement control unit 115 displays a message in a display device such as a touch panel arranged on the instrument panel. The message is such as "Place the portable device 20a at the next scheduled position and press the start button or end button." When the worker presses the start button, the process returns to step S505, and steps S505 to S530 are executed again. Then, in this case, in step S530, it is determined that the slope Δ has not been calculated at all the planned positions. On the other hand, the worker may press the end button in response to the message "Please put the portable device 20a at the next scheduled position and press the start button or the end button". In this case, the process returns to step S505, and steps S505 to S530 are executed again. Here, it is determined in step S530 that the slope Δ has been calculated at all the planned positions.

When it is determined in step S530 that the slope Δ has been calculated at all the scheduled positions (step S530: YES), the distance measurement unit 114 calculates the distance between each scheduled position and the antenna of the BLE communicator device 30 (step S540). The distance measurement control unit 115 calculates the difference between the distance calculated in step S540 (hereinafter, referred to as "calculated distance") and the actually measured distance (step S545). In the present embodiment, the distance between each scheduled position and the antenna of the BLE communicator device 30 is measured in advance and stored in the EEPROM 120 of the in-vehicle device 10a. Therefore, in step S545, the actually measured distance is read from the EEPROM 120 and used to calculate the difference from the calculated distance.

The distance measurement control unit 115 sets the slope Δ corresponding to the calculated distance that provides the smallest difference among the differences obtained in step S545 for the respective scheduled positions to the slope threshold value Δth (step S550). For example, suppose a case where the distance is calculated using the pilot signals received at a total of four locations A to D, and the difference between the calculated distance and the measured distance is the smallest at position A. In such a case, the slope Δ obtained by using the pilot signal received at the position A is set as the slope threshold value Δth. A small difference between the calculated distance and the measured distance means that the distance is calculated accurately. By setting the slope Δ at that time as the slope threshold value Δth, the accuracy of the distance calculated by the distance measurement process can be further improved. After the completion of step S550, the slope threshold setting process ends.

The distance measurement system 400a of the third embodiment described above has the same effect as the distance measurement systems 400 and 400a of the first and second embodiments. In addition, since the slope Δ when the difference between the calculated distance and the measured distance is the smallest is set to the slope threshold value Δth, the accuracy of the distance calculated by the distance measurement process can be further improved.

D. Other Embodiments

(D1) Other Embodiment 1

In each embodiment, in the portable devices 20 and 20a, the distance measurement process is executed when the power is turned on, but the present disclosure is not limited to this. In principle, in order to reduce the power consumption of the portable devices 20 and 20a, the portable devices 20 and 20a may be operated in a so-called sleep mode. When a trigger signal is received from the in-vehicle device 10, 10a, 10b, the distance measurement process may be executed by returning from the sleep mode to the normal operation mode. In such a configuration, a trigger signal may be transmitted from the in-vehicle device 10, 10a, 10b to the portable device 20, 20a in the sleep mode. The portable device 20, 20a may transmit the response signal against the trigger signal to the in-vehicle device 10, 10a, 10b. The in-vehicle device 10, 10a, 10b that has received such a response signal may transmit the pilot signal transmission request to the portable device 20, 20a.

(D2) Other Embodiment 2

In the second and third embodiments, the transmission of the speed-related value from the portable device 20a to the in-vehicle device 10a, 10b is performed together with the pilot signal, but the present disclosure is not limited to this. The speed-related values may be transmitted separately from the pilot signal. For example, in the configuration in which the in-vehicle device 10a transmits the trigger signal as in the other embodiment 1 described above, the response signal against the trigger signal may be transmitted including the speed-related value.

(D3) Other Embodiment 3

In the distance measurement execution of the first embodiment (step S135) and the first distance measurement execution of the second and third embodiments (step S135), the distance is calculated when the slope Δ was not equal to or less than the slope threshold Δth X times in a row, and the calculated distance is specified as a low reliability distance. However, the present disclosure is not limited thereto. When it is determined even once that the slope Δ is not equal to or less than the slope threshold value Δth, the calculated distance may be specified as the low reliability distance. On the contrary, even when the determination that the slope Δ is not equal to or less than the slope threshold value Δth is made repeatedly in many times, the distance calculation may be provided not to be executed. For example, in the execution (step S135) of the distance measurement (first distance measurement) of each embodiment, steps S345 to S360 may be omitted.

(D4) Other Embodiment 4

The configuration of the distance measurement system 400, 400a in each embodiment is merely an example and can be changed in various ways. For example, in the second and third embodiments, step S425 (update of correspondence threshold value) may be omitted. Further, the wireless communication executed by the in-vehicle device 10, 10a, 10b and the portable device 20, 20a is BLE wireless communication. However, instead of the BLE wireless communication, any other type of wireless communication may be used. Further, the portable device 20, 20a is not limited to a smartphone, and may be, for example, a dedicated device for the electronic key for vehicle. Further, in each embodiment, the distance is calculated by using the frequency difference between two frequencies different from each other. However, the distance may be calculated by using the frequency difference of any plurality of frequencies, not limited to the two. Further, the process may proceed without using the distance measurement enable/disable flag. Further, in steps S132 and S515, it may be determined whether or not the portable device 20a is in a stationary state based on arbitrary information other than the speed-related value. For example, the position of the portable device 20a may be specified by GNSS (Global Navigation Satellite System) or the like, and determination may be made based on whether or not the position changes.

(D5) Other Embodiment 5

The distance measurement system 400, 400a and methods thereof described in the present disclosure may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. Further, the computer program may be stored in a computer-readable non-transitory tangible storage medium as instructions executed by a computer.

The present disclosure should not be limited to the embodiments described above, and various other embodiments may be implemented without departing from the scope of the present disclosure. For example, the technical features in each embodiment may be used to solve some or all of the above-described problems, or to provide one of the above-described effects. In order to achieve a part or all, replacement or combination can be appropriately performed. Also, some of the technical features may be omitted as appropriate.

For reference to further explain features of the present disclosure, the description is added as follows.

The functions such as so-called keyless entry or smart entry are adopted as part of functions of a vehicle. In the keyless entry or the smart entry, a control device (i.e., in-vehicle device) mounted in a vehicle wirelessly communicates with a portable device that functions as an electronic key for the vehicle to lock and unlock the vehicle door and the engine. In such functions, the distance between the in-vehicle device and the portable device is measured by using the wireless communication. When measuring a distance using the wireless communication, the signals for distance measurement propagate in multipath and interfere with each other, so that the signal levels are lowered and the distance measurement result may vary. In a known distance measurement, the variation (standard deviation) in the distance measurement results is obtained in advance for each of a plurality of frequencies that can be used for wireless communication, and the frequency used for the distance measurement is determined.

When the above distance measurement method is applied to the measurement of the distance between the in-vehicle device and the portable device, the frequency used for the distance measurement is specified. Therefore, it is necessary to repeatedly transmit and receive a distance measurement signal and calculate a distance for each of a plurality of frequencies that can be used for wireless communication, and obtain a variation (standard deviation). Therefore, it takes a long time to select the frequency to be used for distance measurement. There is an issue that the power consumption of the portable device is high.

Therefore, in a distance measurement system including an in-vehicle device and a portable device, a technique capable of accurately measuring a distance in a short period of time with low power consumption is desired.

An aspect of the present disclosure described herein is set forth in the following clauses.

According to an aspect of the present disclosure, a distance measurement system is provided to include an in-vehicle device mounted on a vehicle and a portable device to perform wireless communication with the in-vehicle device to measure a distance between the in-vehicle device and the portable device. In the distance measurement system, the portable device includes a pilot signal transmission unit configured to sequentially transmit pilot signals at predetermined time intervals; the pilot signals are wireless signals of a plurality of frequencies different from each other included in a frequency band used for the wireless communication. The in-vehicle device includes: a distance measurement unit configured to execute a distance measurement process to obtain a distance by performing the wireless communication with the portable device; a reception signal strength measurement unit configured to receive each of the pilot signals of the plurality of frequencies and measure a reception signal strength of each of the pilot signals to provide a measurement result; and a distance measurement control unit configured to control the distance measurement process by the distance measurement unit. The distance measurement control unit is further configured: to execute a determination as to whether a slope of a straight line obtained by linearly approximating a time and the reception signal strength of each of the pilot signals is equal to or less than a predetermined slope threshold value using the measurement result of the reception signal strength of each of the pilot signals. The distance measurement unit is further configured to specify the distance obtained by causing the distance measurement unit to execute the distance measurement process as a high reliability distance, in response to a predetermined allowable condition being satisfied, the predetermined allowable condition including that the slope of the straight line is determined to be equal to or less than the slope threshold value. In addition, the distance measurement unit is further configured (i) not to specify the distance obtained by causing the distance measurement unit to execute the distance measurement process as the high reliability distance or (ii) to cause the distance measurement unit not to execute the distance measurement process, in response to the predetermined allowable condition being not satisfied.

The distance measurement system according to the aspect is configured: to execute a determination as to whether a slope of a straight line obtained by linearly approximating a time and the reception signal strength of each of the pilot signals is equal to or less than a predetermined slope threshold value $\Delta$th using the measurement result of the reception signal strength of each of the pilot signals; and to specify the distance obtained by causing the distance measurement unit to execute the distance measurement process as a high reliability distance, in response to a predetermined allowable condition being satisfied, the predetermined allowable condition including that the slope of the straight line is determined to be equal to or less than the slope threshold value $\Delta$th. Therefore, when the slope of the straight line is equal to or less than the slope threshold value $\Delta$th and the variation in the reception signal strength caused by the interference of the pilot signals due to multipath is small, the obtained distance can be set as the high reliability distance. In this case, it is not necessary to transmit and receive the pilot signals for each frequency a plurality of times. Therefore, in the distance measurement system including the in-vehicle device and the portable device, the distance measurement can be performed accurately in a short period of time with low power consumption. On the other hand, when the predetermined allowable condition is not satisfied, the distance obtained by causing the distance measurement unit to execute the distance measurement process is not specified as the high reliability distance or the distance measurement unit is caused not to execute the distance measurement process. Therefore, in the configuration in which the distance obtained when the slope of the straight line is not less than the slope threshold $\Delta$th and the variation in the reception signal strength caused by the interference of the pilot signals due to multipath is not small is specified as the low reliability distance, accurate distance measurement can be performed in a short period of time with low power consumption. Further, in the configuration in which the distance measurement process is not executed, it is possible to prevent unnecessary distance measurement process from being executed in a situation where a high reliability distance cannot be obtained.

The present disclosure can also be realized in various forms other than the distance measurement system. For example, it can be realized in the form of an in-vehicle device, a portable device, a distance measurement method, a computer program for realizing these devices or methods, a storage medium for storing the computer program, or the like.

What is claimed is:

1. A distance measurement system comprising:
an in-vehicle device mounted on a vehicle; and
a portable device configured to perform wireless communication with the in-vehicle device to measure a distance between the in-vehicle device and the portable device,
wherein the portable device comprises:
a pilot signal transmission unit configured to sequentially transmit pilot signals at predetermined time intervals, the pilot signals being wireless signals of a plurality of frequencies different from each other included in a frequency band used for the wireless communication,
wherein the in-vehicle device comprises:
a distance measurement unit configured to execute a distance measurement process to obtain a distance between the in-vehicle device and the portable device by performing the wireless communication with the portable device;
a reception signal strength measurement unit configured to receive each of the pilot signals of the plurality of frequencies and measure a reception signal strength of each of the pilot signals to provide a measurement result; and
a distance measurement control unit configured to control the distance measurement unit to execute the distance measurement process, wherein the distance measurement control unit is further configured:

to execute a slope determination to determine whether a slope of a straight line obtained by linearly approximating a time and the reception signal strength of each of the pilot signals is equal to or less than a predetermined slope threshold value using the measurement result of the reception signal strength of each of the pilot signals, wherein:

in response to a predetermined allowable condition being satisfied, the allowable condition including the slope determination determining that the slope is equal to or less than the slope threshold value, the distance measurement control unit is further configured to specify the distance obtained by the distance measurement process executed by the distance measurement unit as a high reliability distance; and in response to the predetermined allowable condition being not satisfied, the distance measurement control unit is further configured to prevent the distance obtained by the distance measurement process executed by the distance measurement unit from being specified as the high reliability distance or to prevent the distance measurement unit from executing the distance measurement process.

2. The distance measurement system according to claim 1, wherein:

in response to the slope determination not determining that the slope is equal to or less than the slope threshold value, the distance measurement control unit is further configured to execute the slope determination again; and in response to a total number of executions of the slope determination becomes larger than a predetermined threshold number, the distance measurement control unit is further configured to cause the distance measurement unit to execute the distance measurement process and specify the obtained distance as a low reliability distance.

3. The distance measurement system according to claim 1, wherein the portable device further comprises:

a movement detector device configured to detect a speed-related value related to a movement speed of the portable device; and a speed-related value transmission unit configured to transmit the detected speed-related value to the in-vehicle device, wherein:

in response to the slope determination not determining that the slope is equal to or less than the slope threshold value, the distance measurement control unit is further configured to execute the slope determination again;

in response to a total number of executions of the slope determination exceeding a predetermined threshold number, the distance measurement control unit is further configured to determine whether the speed-related value received from the portable device is equal to or less than a corresponding threshold value that corresponds to a predetermined threshold speed for the movement speed in order to determine whether the portable device is in a moving state or a stationary state;

in response to determining that the speed-related value is equal to or less than the corresponding threshold value, the distance measurement control unit is further configured to cause the distance measurement unit to execute the distance measurement process, and specify the obtained distance as the high reliability distance; and in response to not determining that the speed-related value is equal to or less than the corresponding threshold value, the distance measurement control unit is further configured to cause the distance measurement unit to execute the distance measurement process, and specify the obtained distance as a low reliable distance.

4. The distance measurement system according to claim 3, further comprising:

a threshold setting unit configured to set the corresponding threshold value, wherein:

in response to the slope determination determining that the slope is equal to or less than the slope threshold value, the distance measurement control unit is further configured to determine whether or not the speed-related value received from the portable device is equal to or less than the corresponding threshold value; and in response to (i) the slope being determined to be equal to or less than the slope threshold value and (ii) the speed-related value being determined to be equal to or less than the corresponding threshold value, the threshold setting unit is further configured to update the corresponding threshold value by using the speed-related value received from the portable device.

5. The distance measurement system according to claim 1, further comprising:

a slope threshold setting unit configured to set the slope threshold value, wherein the slope threshold setting unit is further configured to execute a slope threshold setting process for controlling the portable device and the in-vehicle device to set the slope threshold value, wherein in the slope threshold setting process:

the slope threshold setting unit is further configured to execute a movement determination as to whether or not the portable device is moving;

in response to not determining that the portable device is moving, the slope threshold setting unit is further configured to execute a transmission control to cause the portable device to sequentially transmit the pilot signals of the plurality of frequencies at predetermined time intervals;

the slope threshold setting unit is further configured to execute a distance measurement execution process that causes the in-vehicle device to calculate the slope of the straight line and execute the distance measurement process; and in response to the movement determination, the transmission control, and the distance measurement execution process being executed when the portable device is arranged at each of a plurality of predetermined positions, the slope threshold setting unit is further configured to determine the slope threshold value by using (i) the calculated slope of the straight line and (ii) a difference between (a) the obtained distance resulting from the distance measurement execution process and (b) an actually measured value of a distance to a wireless antenna used in the in-vehicle device from each of the predetermined positions.

6. A computer-implemented method performed by one or more processors used for an in-vehicle device in a distance measurement system including the in-vehicle device and a portable device configured to perform wireless communication with the in-vehicle device for measuring a distance between the in-vehicle device and the portable device, the method comprising:

receiving pilot signals, which are sequentially transmitted from the portable device at predetermined time intervals, the pilot signals being wireless signals of a plurality of frequencies different from each other included in a frequency band used for the wireless communication;

using a measurement result of a reception signal strength of each of the pilot signals to executing a slope determination as to whether a slope of a straight line obtained by linearly approximating a time and the reception signal strength of each of the pilot signals is equal to or less than a predetermined slope threshold value;

specifying, as a high reliability distance, the distance obtained by executing a distance measurement process to measure the distance with the portable device by performing the wireless communication with the portable device, in response to a predetermined allowable condition being satisfied, the predetermined allowable condition including the slope determination determining that the slope is equal to or less than the slope threshold value; and (i) preventing the distance obtained by executing the distance measurement process from being specified as the high reliability distance or (ii) preventing the distance measurement process from being executed, in response to the predetermined allowable condition being not satisfied.

7. A non-transitory computer readable storage medium storing a computer program product comprising instructions for execution by a computer, the instructions including the method according to claim 6, the method being computer-implemented.

8. A distance measurement system comprising:
an in-vehicle device mounted on a vehicle; and
a portable device configured to perform wireless communication with the in-vehicle device to measure a distance between the in-vehicle device and the portable device, wherein the portable device comprises one or more than one first processor configured to transmit pilot signals sequentially at predetermined time intervals, the pilot signals being wireless signals of a plurality of frequencies different from each other included in a frequency band used for the wireless communication, wherein the in-vehicle device comprises one or more than one second processor configured:

to execute a distance measurement process to obtain a distance between the in-vehicle device and the portable device by performing the wireless communication with the portable device;

to receive each of the pilot signals of the plurality of frequencies and measure a reception signal strength of each of the pilot signals to provide a measurement result; and to control the distance measurement process, wherein the second processor is further configured:

to execute a slope determination to determine whether a slope of a straight line obtained by linearly approximating a time and the reception signal strength of each of the pilot signals is equal to or less than a predetermined slope threshold value using the measurement result of the reception signal strength of each of the pilot signals, wherein:

in response to a predetermined allowable condition being satisfied, the allowable condition including the slope determination determining that the slope is equal to or less than the slope threshold value, the second processor is further configured to specify the distance obtained by the distance measurement process as a high reliability distance; and in response to the predetermined allowable condition being not satisfied, the second processor is further configured to prevent the distance obtained by the distance measurement process from being specified as the high reliability distance or to prevent the distance measurement process from being executed.

* * * * *